(12) United States Patent
Zhang

(10) Patent No.: US 8,805,007 B2
(45) Date of Patent: Aug. 12, 2014

(54) INTEGRATED BACKGROUND AND FOREGROUND TRACKING

(75) Inventor: Yuecheng Zhang, Princeton, NJ (US)

(73) Assignee: Disney Enterprises, Inc., Burbank, CA (US)

( * ) Notice: Subject to any disclaimer, the term of this patent is extended or adjusted under 35 U.S.C. 154(b) by 141 days.

(21) Appl. No.: 13/272,869

(22) Filed: Oct. 13, 2011

(65) Prior Publication Data

US 2013/0094696 A1    Apr. 18, 2013

(51) Int. Cl.
*G06K 9/00* (2006.01)

(52) U.S. Cl.
USPC .......................................................... 382/103

(58) Field of Classification Search
None
See application file for complete search history.

(56) References Cited

U.S. PATENT DOCUMENTS

| | | | |
|---|---|---|---|
| 5,264,933 | A | 11/1993 | Rosser et al. |
| 5,491,517 | A | 2/1996 | Kreitman et al. |
| 5,543,856 | A | 8/1996 | Rosser et al. |
| 5,912,700 | A | 6/1999 | Honey et al. |
| 6,741,725 | B2 | 5/2004 | Astle |
| 7,015,978 | B2 | 3/2006 | Jeffers et al. |
| 7,116,342 | B2 | 10/2006 | Dengler et al. |
| 2003/0081813 | A1* | 5/2003 | Astle ............................. 382/103 |
| 2006/0171584 | A1* | 8/2006 | Sandrew ....................... 382/162 |
| 2011/0013836 | A1* | 1/2011 | Gefen et al. .................. 382/171 |

OTHER PUBLICATIONS

T. Amiaz et al., "*Piecewise-Smooth Dense Optical Flow via Level Sets*", International Journal of Computer Vision, vol. 68 No. 2, Jun. 2006, pp. 111-124.

A. Briassouli et al., "*Combination of Accumulated Motion and Color Segmentation for Human Activity Analysis*", Informatics and Telematics Institute Centre for Research and Technology Hellas Thermi-Thessalonki, 57001, Greece, Dec. 13, 2007, pp. 1-40.

R. Munoz-Salinas et al., *Adaptive multi-modal stereo people tracking without background modelling*, J. Vis. Commun. Image R. 19 (2008), pp. 75-91.

* cited by examiner

*Primary Examiner* — Stephen R Koziol
*Assistant Examiner* — Amandeep Saini
(74) *Attorney, Agent, or Firm* — Fay Kaplun & Marcin, LLP

(57) ABSTRACT

Systems and methods for tracking the foreground and background objects in a video image sequence. The systems and methods providing for determining a camera model based on a first group of feature points extracted from a video frame, extracting three-dimensional (3D) information for the first group of feature points based on the camera model and a previous camera model for a previous video frame, reassigning feature points to the first group or a second group, based on mapping each feature point to a corresponding 3D model using the extracted 3D information for each feature point and determining a new camera model when a number of reassigned feature points is greater than a predetermined threshold.

20 Claims, 8 Drawing Sheets

INTEGRATED BACKGROUND AND FOREGROUND TRACKING

FIELD OF THE INVENTION

The exemplary embodiments relate to systems and methods that track the foreground and background objects in a video image sequence concurrently. Pixels belonging to the image foreground are discerned from those belonging to the image background, by integrating camera tracking and dynamic object tracking into a single process. According to the exemplary embodiments, the camera tracking portion of the process generates camera model information, while the dynamic object tracking tracks the position of foreground objects based on the determined camera model information.

BACKGROUND INFORMATION

Due to the employment of augmented reality technologies carried out by video insertion systems the experience of viewing many types of programs, including sporting events, has been enhanced by the ability to insert virtual enhancements (also referred to as elements, inserts, graphics, logos, or indicia) into a particular location of the video image that a viewer is watching on television. For instance, in football, a First Down Line (FDL) is inserted into the real time broadcast of a game to signify the point on the field that the team currently on offense must drive towards in order to be awarded four more downs. In another example, a Down and Distance (DnD) arrow denoting the play number and the distance left to reach the FDL. While these virtual elements' positions and appearances are determined live based on game progression, other virtual elements may be unrelated to the game events, such as advertising indicia inserted at various areas on the field of play or on various stadium structures like a stadium wall.

An insertion system is a system and method for inserting graphics (virtual elements) into a live video broadcast in a realistic fashion on a real time basis. Generally, the perspective of the camera is being continuously estimated so that graphical elements, either 2D or 3D, may be projected to the video image from the current camera's perspective as if these graphical elements were located at a pre-determined position and orientation in the scene.

Live broadcast Video Insertion Systems (VIS) were developed and are used commercially for the purpose of inserting advertising and other indicia into video sequences, including live broadcasts of sporting events. An example of such a live broadcast VIS is used commercially under the trade name L-VIS®. In further examples, live broadcast VIS are described in U.S. Pat. Nos. 5,264,933, 5,543,856 to. Rosser et al., and U.S. Pat. No. 5,491,517 to Kreitman et al., which are hereby incorporated by reference in their entirety. These VIS, to varying degrees of success, seamlessly and realistically incorporate indicia into the original video in real time. Realism is maintained even as the camera changes its perspective throughout the event coverage and moving elements in the scene that may occlude the inserted indicia are displayed over them.

FIG. 1 shows a top level block diagram of a typical VIS 100. The main VIS computing component 120 receives a live video feed 110 from a camera and then outputs, possibly with some latency, an enhanced video 115. In addition, the system includes a GUI component 150 with which an operator controls the system before and during an event and an indicia unit 170 where representations of the inserted virtual elements are stored.

Recognition and tracking module 125 performs a recognition process that analyzes the incoming video signal in order to recognize pre-selected landmarks in the image. Such landmarks correspond to prominent, unique features such as lines, conics, junctions, corners, etc. Based on their geometrical structure, appearance, or any other attributes their correspondence with landmarks in a scene model is determined. In order to facilitate the recognition of these video image landmarks, the frames of the incoming video signal may, prior to being searched, be decimated according to any suitable technique, for example, the Burt pyramid algorithm. This recognition process may be carried out every several frames.

Once the landmarks in the scene are recognized, the recognition and tracking module also tracks these landmarks on a frame by frame basis, in order to determine how the recognized landmarks are moving from frame to frame, which provides a measure of how the camera providing the video signal is moving. Typically, at least three landmarks are tracked, although that is not an absolute minimum requirement. By tracking the landmarks, the VIS is able to determine the incremental change in the camera's perspective, and thereby allows VIS 100 to adjust the projection of the logo in the scene onto the video frames.

Tracking in such systems involves tracking the background motion from frame-to-frame, which provides an indication of how the camera is moving from frame-to-frame according to, for example, its pan, tilt, zoom, and roll movements. This tracking is typically based on frame-to-frame comparisons of previously determined background features of the image, such as markings on the field (e.g., yard line markers on a football field), stadium walls, sidelines, or any other sharp, bold, and clear vertical, horizontal, diagonal, or corner features. That is, the system obtains movement information of the camera from a current image of a video image sequence by monitoring the motion of such background features. More specifically, the system, prior to the real-time insertion process, selects at least three visually distinctive landmarks (distinctive enough to survive decimation by the Burt pyramid pattern recognition algorithm, for instance), and then recognizes a single reference point in the image that is mathematically defined in relation to the landmarks. The tracking also involves the calculation of a transform model. A transform model defines how a reference 3D world (scene) model (which is independent of the camera's pose) spatially corresponds to the current image. A camera model is a specific type of transform model expressed in terms of camera parameters, e.g., pan, zoom, tilt, and roll. An example of a system that generates such camera models is taught by U.S. Pat. No. 6,741,725 to Astle, which is hereby incorporated by reference.

Next, based on the found landmarks, the current camera's model may be estimated using camera model estimator module 130. A camera's model is a mathematical operator that maps a 3D point from the scene space to its corresponding point in the video image space. The camera's model is composed of intrinsic parameters, such as focal length, and extrinsic parameters, such as the camera's position and orientation (pan, tilt, and rotation).

Having the current camera's model estimate, the warping unit 135 warps (projects) a given virtual element into the current video image space. For instance, a virtual element may be a logo. This logo may be represented in the indicia database 185 by its image (e.g. BMP or GIF format) and its desired location (insertion region) within the scene's 3D space. The warping unit 135 will then warp this logo's image, using the camera's model, into a new indicia image within the current video image space; this new indicia image is then ready to be rendered into the video image by the mixer 145. Note that, a virtual element is not limited to a 2D graphic, but may be any 3D structure. In this case, a 3D virtual element representative data in the indicia database 185 may be its 3D model (polygonal mesh or point-based representation), texture, and desired position, orientation, and scale in the scene. Similarly, knowledge of the current camera's model may be used to render this 3D element from this camera perspective.

Next, the occlusion mask generator 140 generates a transparency function or mask key, that is then applied to the insertion process at the mixer 145 to properly account for any obstacles that may be present in the insertion region. By performing an occlusion processing prior to insertion, VIS 100 ensures that the verisimilitude of the inserted logo into the video image is preserved when a physical element like a player steps into the insertion region. Rather than occlude the player with the inserted logo, the transparency function or mask key ensures that at every pixel location where an overlap occurs between the player and the logo, the pixel corresponding to the logo is suppressed in favor of the pixel of the image of the player. Hence, at the mixer 145 the warped indicia images are superimposed with the video image based on the occlusion mask.

An operator, via a GUI component 150, controls the insertion processing system 120. Before the game, the operator sets and trains the system, preparing it for the live event. Typically, the operator enters data regarding the scene usually via graphical interface. The operator defines the 3D coordinates of landmarks in the scene within a 3D coordinate system of the scene modeling unit 155. For example, in a sporting event the field structure will be entered. The operator may also train the system to recognize color characteristics of the dynamic foregrounds (players) and color characteristics of the static background (field) using color modeling unit 160. These data may be used later for occlusion mask generation. Other information the operator typically enters into the system is the desired insertion 3D location and orientation using the indicia positioning unit 165 of each virtual element stored in the indicia database 185. As will be explained below, depending on the type of indicia, this information may be entered during pre-event setting or during the game.

Another type of augmented reality system involves the tracking of dynamic elements of the video image sequence. For instance, a fan watching a hockey game on television may have trouble visually following a hockey puck during a game, because of its small size and high velocity. Other sports, like football, involve large amounts of players on each team, with each player having his movements restricted according to the rules of the game (e.g., lineman must stay behind the line of scrimmage in a pass play until the quarterback throws the pass). Visually tracking which player is legally beyond the line of scrimmage or not may prove too difficult for the typical viewer, given the large number of players involved and their largely unpredictable movements. An exemplary system that tracks players and game objects like pucks, balls, hockey sticks, etc., are taught in U.S. Published Patent Appln. No. 2011/0013836, which is hereby incorporated by reference.

The ability to distinguish between foreground and background elements of a scene is critical for the extraction of an accurate camera model and positional data of dynamic objects in systems like the VIS and dynamic object tracking systems described above. Certain prior systems for tracking dynamic foreground objects have relied on sensors to determine the position and orientation of a dynamic foreground object like a player or ball. For instance, U.S. Pat. No. 7,116,342 to Dengler et al. is a system for inserting perspective correct content into an image sequence. According to the '342 patent, before an insert is inserted into an image sequence (e.g., inserting a logo onto the jersey of a player moving on the field), it is transformed according to orientation and size so that it appears realistically when inserted as part of a player's uniform. The tracking of the player is performed by sensors and without reference to any content contained in the image sequence.

Another sensor-based system is described in U.S. Pat. No. 5,912,700 to Honey et al. The '700 patent describes a system that includes one or more sensors to determine the location of a dynamic object to have its appearance enhanced. In the preferred embodiment of the '700 patent, sensors embedded in a hockey puck communicate with receivers that are deployed around the arena to track the movement of the puck during a game. Because the video production system determines the location of the puck in a video frame during game play, the system of the '700 patent can graphically enhance the image of the puck in order to make it more visible to a person watching the game on television.

The '342 and '700 patents describe systems that employ sensor-based techniques to track the movement of dynamic foreground objects. However, using sensors attached to the dynamic objects may not be an option or may not be providing the required data spatial and temporal resolution. For example, attaching sensors to the players' body requires concession from the team and the league, and usually not in the discretion of the broadcasting company. In addition, these methods cannot be applied to post-production processing where corresponding sensory data are not available. In contrast, methods that are vision-based offer more flexibility and may be applied to either live or post-production video streams without being dependent on the availability of sensory data. Generally, vision-based processing yields high temporal resolution (e.g. 30 msec) and spatial resolution that is as high as the video image resolution.

DETAILED DESCRIPTION

Figure 1:
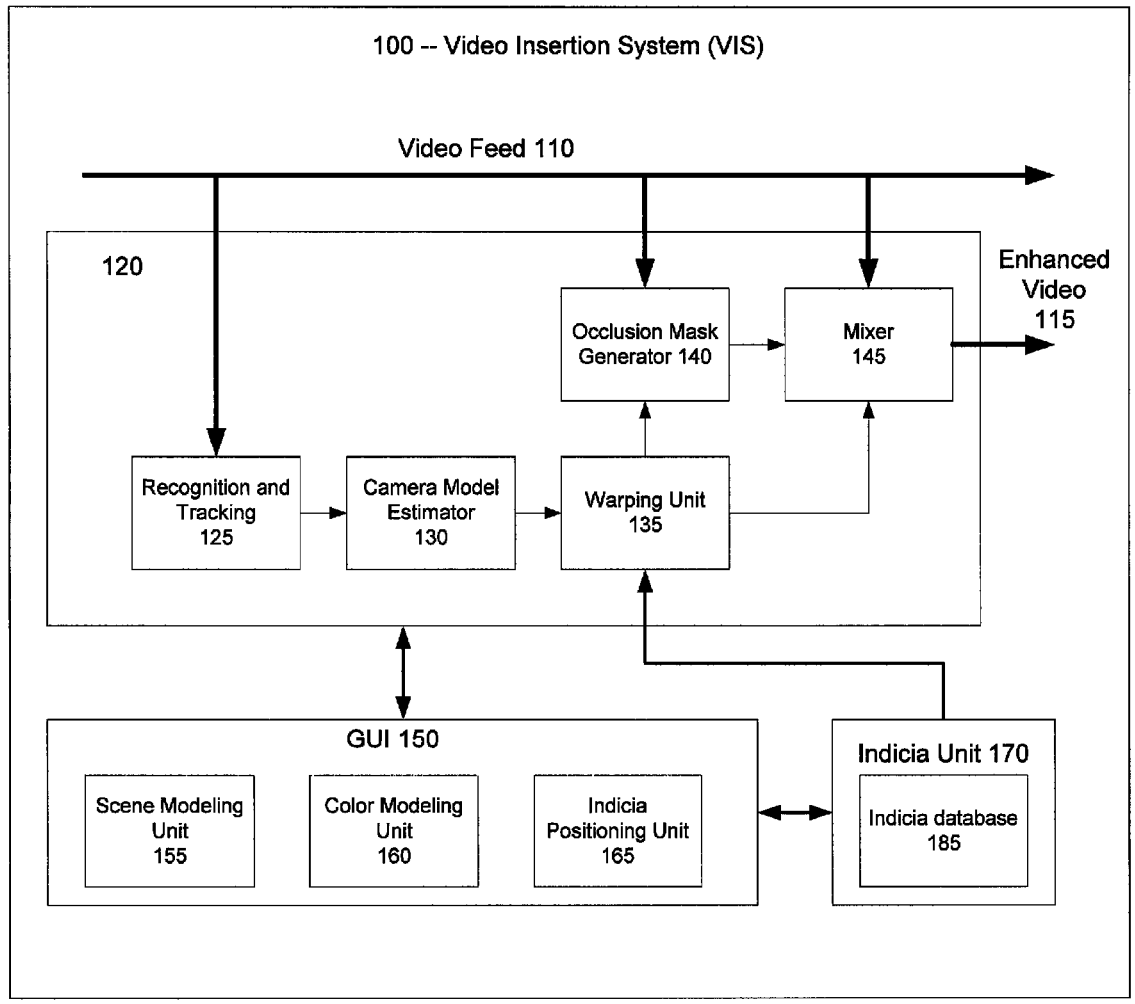
FIG. 1 shows a conventional live broadcast video insertion system (VIS).

The exemplary embodiments may be further understood with reference to the following description of the exemplary embodiments and the related appended drawings, wherein like elements are provided with the same reference numerals. The exemplary embodiments are related to systems and methods for ensuring that objects in a video image sequence are tracked accurately and in a computationally efficient manner. The exemplary embodiments are described in relation to the tracking of moving objects (otherwise referred to as dynamic objects), but the present invention encompasses as well the tracking of stationary objects in a video image sequence. The methods of the exemplary embodiments may be advantageously implemented using one or more computer programs executing on a computer system having a processor or central processing unit, such as, for example, a computer using an Intel-based CPU, such as a Pentium or Centrino, running an operating system such as the WINDOWS or LINUX operating systems, having a memory, such as, for example, a hard drive, RAM, ROM, a compact disc, magneto-optical storage device, and/or fixed or removable media, and having a one or more user interface devices, such as, for example, computer terminals, personal computers, laptop computers, and/or handheld devices, with an input means, such as, for example, a keyboard, mouse, pointing device, and/or microphone.

In the above description, it was noted that there are many examples of systems and methods for the tracking of objects in a video image sequence, and the above provided several examples of such systems and methods. However, it is noted that the exemplary embodiments are not limited to such systems and methods. That is, as will be described in more detail below, the exemplary systems and methods may be applied to any type of augmented reality system that involves the tracking of objects in the video image sequence. It is also noted that in the above description and the following description, the exemplary event sites are described as sporting events sites. However, the exemplary embodiments are not limited to such remote event sites. It may be that the exemplary embodiments are implemented for a studio show.

Figure 2:
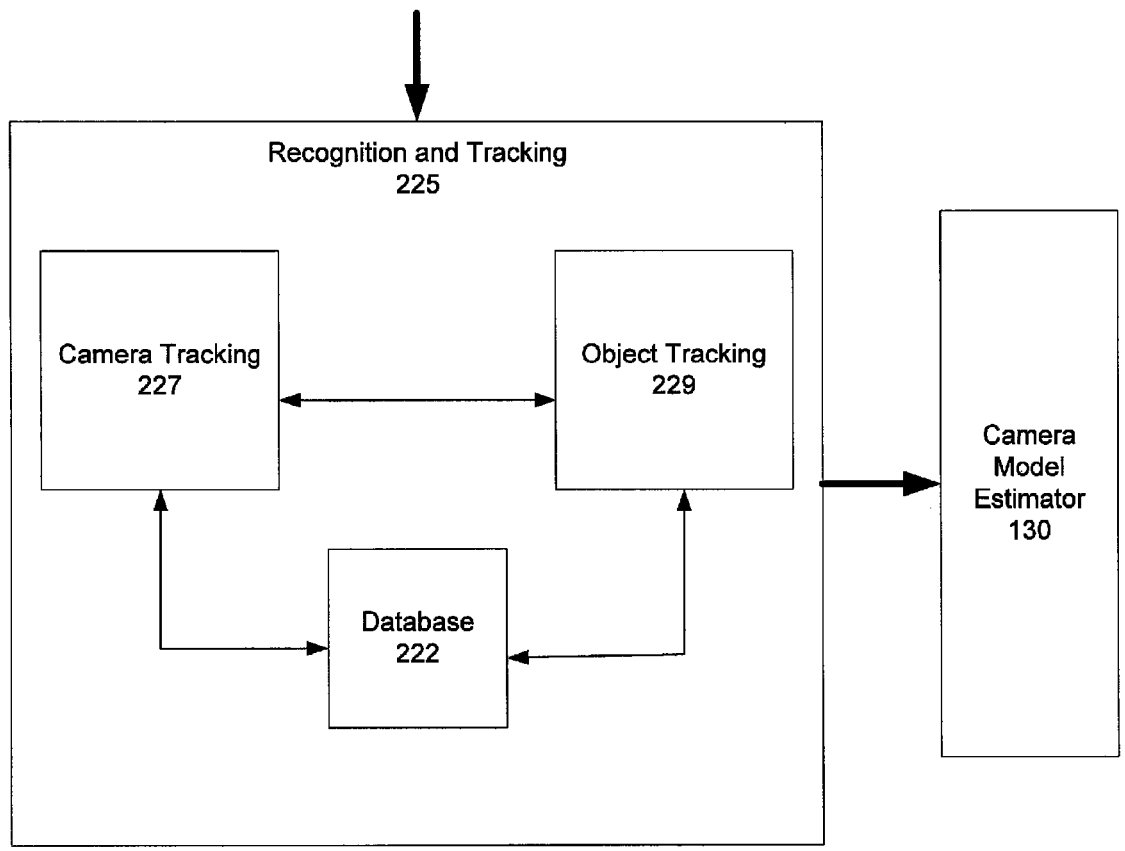
FIG. 2 shows an exemplary modified recognition and tracking module that may perform the recognition and tracking functions of a VIS according to the exemplary embodiments.

FIG. 2 shows a modified recognition and tracking module 225 that may perform the recognition and tracking functions of a VIS. That is, the modified recognition and tracking module 225 may replace the recognition and tracking module 125 of the VIS 100. For ease of illustration, the remaining components of the VIS system are not shown in FIG. 2, with the exception of the camera model estimator 130. Moreover, the components described herein for the modified recognition and tracking module 225 are not limited to the tracking functionality of the module 225. Thus, while not shown or described in detail, the module 225 may also perform the recognition function as described above or may implement any other type of recognition function as known in the art. Also, although the modified recognition and tracking module 225 is described with regard to its use in a VIS, it may also be used in a system dedicated to object tracking (e.g., player, balls, etc.).

A video image sequence comprising a plurality of video frames enters into the recognition and tracking module 225 and is supplied to camera tracking module 227. In this example, the video image sequence may be a single-view video sequence, although the exemplary embodiments may be applied to multiple-view video sequences. The camera tracking module 227, using a reference image associated with the camera that has produced the input video image sequence, determines how the camera has moved in relation to the reference image. That is, the camera tracking module 227 determines the motion of certain pre-selected features in the background to determine a camera model consisting of the various types of motions that the camera has exhibited, as reflected in the relative movement between the predetermined background features of the current frame and the same features in the reference image.

Embedded with the camera tracking functionality of the recognition and tracking module 225 is an object tracking module 229. As described above, the essential problems solved by the camera tracking module 227 and the object tracking module 229 are the opposite. A database 222, recording characteristics of tracked foreground and background regions, may be used to resolve the tracking at frames where there is not enough differentiating information. The camera tracking module 227 tracks the movement of the background pixels, while the object tracking module 229 tracks the movement of the foreground pixels. However, as will be described in greater detail below, the recognition and tracking module 225 that includes these two functionalities may use the output of each functionality in a complementary manner to upgrade the output of the other functionality, e.g., using data from the camera tracking module 227 may significantly improve the performance of the object tracking module 229 relative to a standalone object tracking system. For instance, by using the [SGI]background motion information produced by the camera tracking module 227, a dynamic reference (background) image may be generated that may be used for background subtraction when tracking objects from a moving camera. That is, as described above, the object tracking module 229 is concerned with tracking the movement of foreground pixels. By using an accurate motion data of background pixels generated by the camera tracking module 227, the object tracking module 229 may subtract out the correct background pixels from the frames and then process only the foreground pixels to determine inter-frame movement of the foreground pixels, thereby alleviating the object tracking module 229 from performing background determinations. In another example, a cluster of image pixels may fit into a physical model such as a flat plane or a cylinder, thereby allowing for the separation of nearby occluding objects. This example will be described in greater detail below. Thus, the recognition and tracking module 225 integrates the search for camera parameters and the search for objects' positional data into one iterative process.

Figure 3:
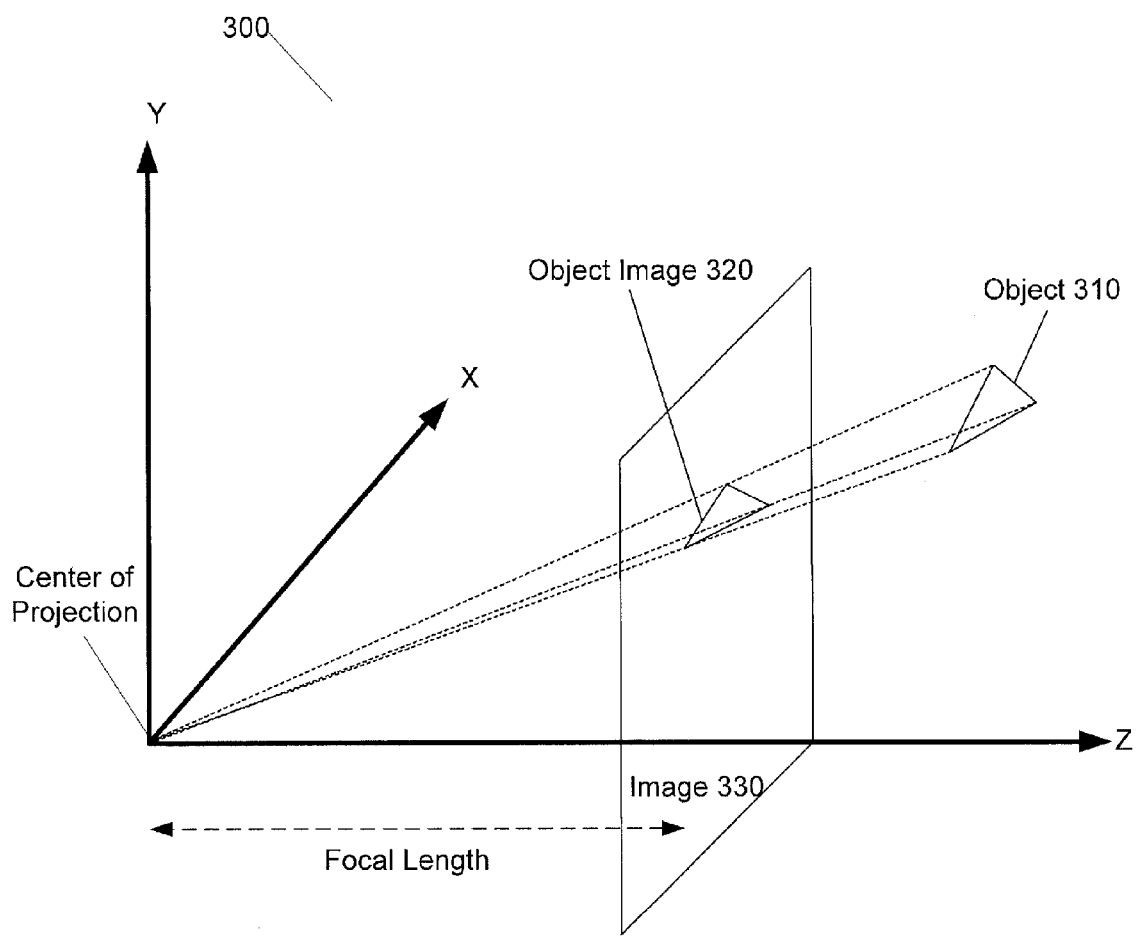
FIG. 3 shows an example of a camera converting a real 3D object in coordinate space into a video image space.

Prior to describing an exemplary method for concurrently performing the camera tracking and object tracking, the following will describe terminology and general concepts associated with tracking the camera and objects within video frames. FIG. 3 shows a pin-hole model of a camera where a real 3D object 310 in coordinate space 300 is projected onto the camera's imaging plane (that is the video image space) 330. In this example, the object 310 in the real 3D coordinate space 300 may be considered to be a triangular prism object 310 that is captured as triangular object image 320 in the 2D image space 330. Hence, the camera projects the scene into its imaging plane 330, with a projection dictated by the camera's parameters (e.g. focal length, position, orientation, etc.). Once this camera's parameters are known, any region within the real-world space 300 may be projected into the camera's imaging plane 330. Estimation of the camera's parameters, in turns, requires knowledge of fiducial points or the landmarks in the scene. Fiducial points or landmarks may be considered known points or locations in the coordinate space 300 of the scene. In the example of the triangular prism object 310 of FIG. 3, the known real world coordinates of the corners of the object 310 may be used. However, to provide another example, the scene that is being captured may be a basketball court including players on the court and also the seating area that includes players and coaches not in the game and also fans in the seating area of the arena. In this example, a basketball court's dimensions are defined within 3D coordinate space, and its scene's model includes the 3D location of each distinctive landmark (e.g., end lines, sidelines, key lines, three point lines, etc.) of the court. The basketball court example will be carried through in more detail below.

However, FIG. 3 shows the camera's imaging plane 330 for a single frame of video. That is, a typical camera captures a video signal at 60 fields/30 frames per second for NTSC/HD and 50 fields/25 frames per second for PAL. Thus, each video signal includes 60 fields/30 frames for NTSC/HD and 50 fields/25 frames for PAL for every second of camera capturing time. From frame to frame or in a sequence of frames there are movements associated with the scene. These movements may be associated with the scene itself, e.g., the players on the court are moving, and may also be associated with the camera, e.g., the camera operator in following the action on the court may be moving the camera's location as well as the camera's pose such as panning, tilting, and zooming to follow the ball. Thus, as described above, there are two types of tracking that may be performed by a VIS system: 1) tracking of the background pixels that are associated with the fiducials or landmarks in order to continuously update the camera model; and 2) tracking the foreground pixels that are associated with scene objects such as the basketball or players on the court.

Figure 4:
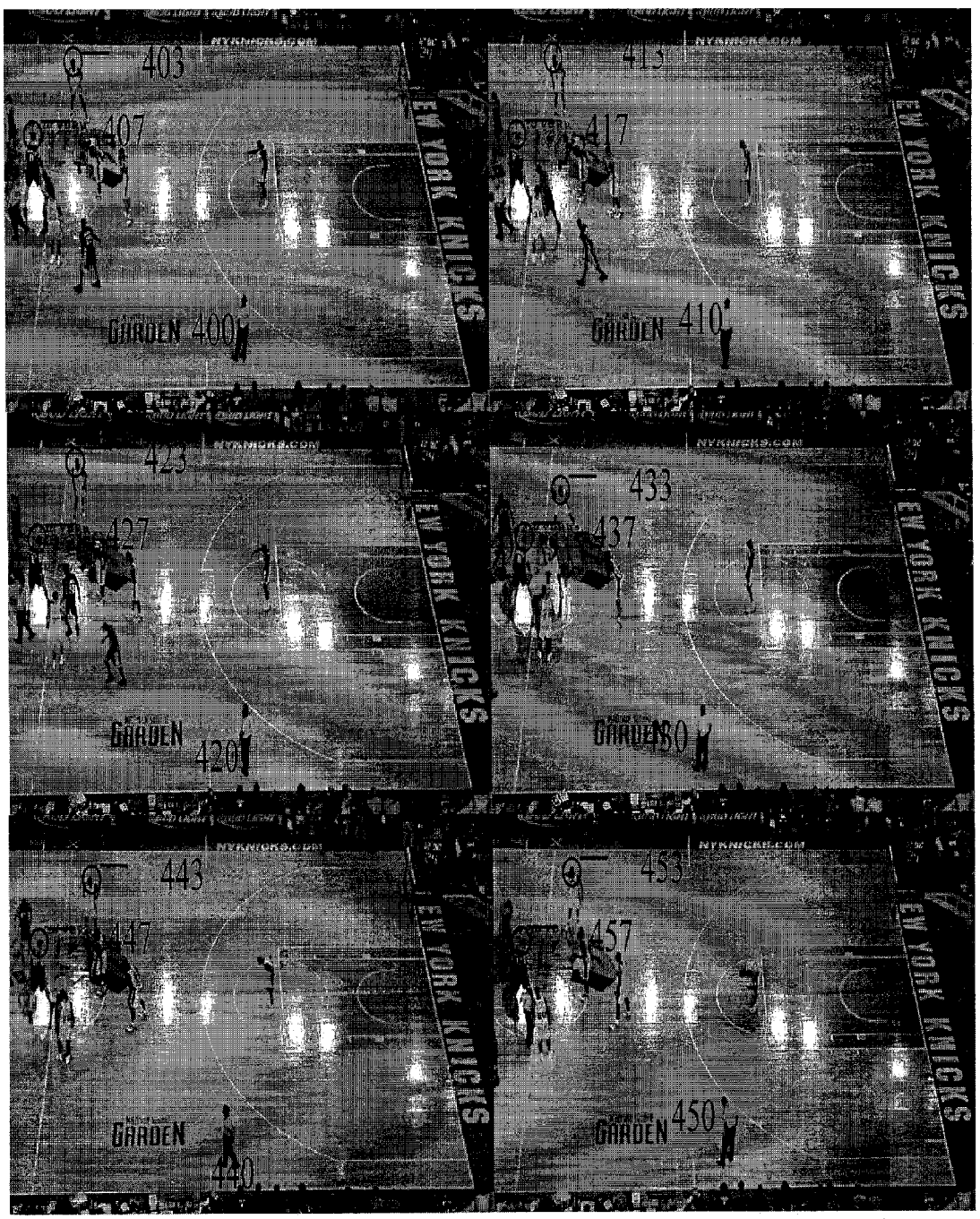
FIG. 4 shows a series of video frames through which pixels in the image space will be tracked according to the exemplary embodiments.

FIG. 4 shows a series of video frames 400-450 through which pixels in the image space will be tracked according to the exemplary embodiments. In the series of video frames, two feature points 403-453 and 407-457 are identified in each frame 400-450, respectively. A feature point is a pixel location in image space from whose neighborhood a feature is extracted. As will be described in greater detail below, this feature may be a scalar or a vector value, and it may be computed based on the value of pixels within a neighborhood (region) of this point. It is noted that the regions are not limited to particular shapes, but may be any number of pixels in the vicinity of the feature point. Those skilled in the art will understand that each frame will include many feature points, but for ease of illustration, the frames 400-450 are shown as including only two feature points.

Those skilled in the art will understand that there are numerous manners of identifying or selecting feature points. In one exemplary embodiment, for each type of feature that is being used in tracking, the closeness of two given feature points is computed. Each feature (vector) comes with a "metric" associated with it. A metric is a function that measures similarity (or distance) between features associated with two image regions. Thus, the metric, based on Feature1 and Feature2 inputs generates an output that is a scalar indicative of the similarity between the two regions (e.g., how likely these image regions are the projection of the same region at the scene). For example, for a general image template, image correlation can be used to evaluate the closeness of two feature points. To evaluate whether a feature point is a trackable feature point, a self-correlation of the feature point in its neighborhood can be performed to check whether a distinctive enough peak appears in the map of the result. For other types of features, it can be checked whether the feature point is a good candidate for tracking by using an evaluation function to evaluate the neighborhood to see if a good enough match only appears in a single position (e.g., where the feature points are located). Alternative approaches may be applied to check whether a feature point is generated from repetitive patterns, camera limitations (e.g., white out/color shifting), or temporary local conditions (e.g., shadows, flashes, light changes) that may harm the correctness of tracking. A good feature will be invariant to such limitations.

Figure 5:
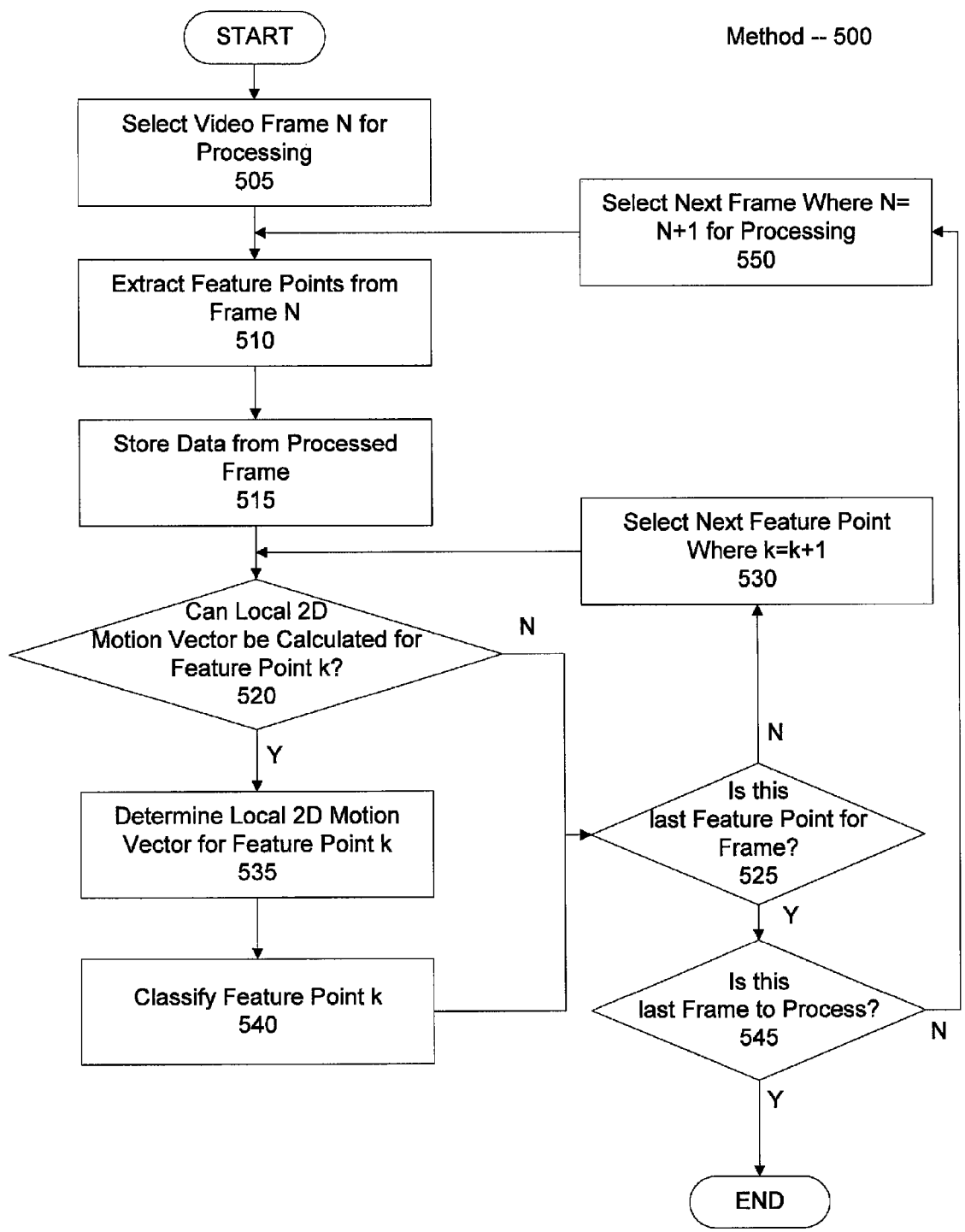
FIG. 5 shows an exemplary method of concurrently estimating the camera model and classifying the image pixels.

FIG. 5 shows an exemplary method 500 of concurrently estimating the camera model and classifying the image pixels. The exemplary method 500 will be described with reference to the frames 400-450 and the corresponding feature points. In step 505, the recognition and tracking module 225 receives and selects a first frame N (e.g., frame 400) for processing. This processing includes extracting the feature points from the frame N in step 510. Thus, in the example of frame 400, the feature points 403 and 407 are extracted. As described above, the extracting of the feature points may involve the calculation of a value (scalar or vector) for the feature point. Again, using the example of frame 400, for feature point 403 the feature value will be calculated based on the pixels in a local neighborhood and for feature point 407 the feature value will be calculated based on the pixels in a local neighborhood. These values may be calculated based on any property extractable from the pixel's neighborhood (e.g., color, intensity, texture, gradient, etc.). These values for all the feature points of the frame N being processed are then stored in step 515.

The method then continues to step 520 where each feature point in the current frame being processed is analyzed. In step 520, it is determined whether the local 2D motion vector may be determined for a first feature point k of the frame N. As will be described in greater detail below, by comparing corresponding feature points in consecutive frames it is possible to generate the local 2D motion vector for the feature point. For example, after frame 410 is processed, it is possible to determine the local 2D motion vector for both feature points 413 and 417 using the history that has been developed for the corresponding feature points 403 and 407 of the previously processed frame 400. However, in certain instances, it may not be possible to compute the motion vector for the feature point k, e.g., when the corresponding feature point in the previous frame is occluded or too noisy for reliable characterization, etc.

If the local 2D motion vector can be determined, the method continues to step 535, where the local 2D motion vector for the feature point k is determined. To provide a specific example of determining a motion vector, assume that a feature point is detected in both frame m and frame n as $p_m$ at $(u_m, v_m)$ and $p_n$ at $(u_n, v_n)$. Then the motion vector $(u, v)_{n,m} = (u_n - u_m, v_n - v_m)$. It is also noted that, in general, n=m+1, meaning that the immediately preceding frame is used to calculate the motion vector. However, the exemplary embodiments are not limited to only the preceding frame for calculating motion vectors. For example, if the tracking program fails to find the feature point in the preceding frame, the motion vector of that particular frame may still be estimated by using information from other preceding/post frames, like: $(u,v)_{n,n-1} = (u,v)_{n,m/(n-m)}$. A more complicated model can be used to achieve a more accurate estimation, which requires information from more preceding/post frames of images. So, in order to get a motion vector for each individual feature point in the scene, multiple previous/post image frames may be used.

After the local 2D motion vector is determined, this information is used in step 540 to classify each feature point into different groups. An exemplary method of performing this classification is described in detail below with respect to FIG. 6. The purpose of classifying the feature points within each frame is to determine whether the feature point is associated with a foreground or background pixel. As described above, the motion of the feature point may be due to either the camera motion or an object motion or both. In the example of the basketball court and game, possible classes include the floor plane, advertisement board planes, players, and audience/seats. Thus, as can be seen from this example, there are classes that belong to the foreground (e.g., players) and classes that belong to the background (e.g., floor plane, advertisement board planes, audience/seats). It is noted that individuals within the audience may move, but such movement is irrelevant to tracking because the audience is generally not an object of interest. That is, the audience has some characteristics of both background (static) and foreground (moving), but generally would be classified as background because the movement is not relevant for the purposes of tracking (e.g., tracking players participating in the game or the ball in the basketball example). Thus, by classifying the pixels associated with the different feature points, this information may then be used to generate the camera model and the tracking information as described above.

After the classification of step 540 or if the local motion vector cannot be determined, the method will proceed to step 525 where it is determined if the processed feature point k is the last feature point for the frame N. If there are additional feature points to be processed for the frame N, the method continues to step 530 where the next feature point k+1 from frame N will be selected for processing and the method will loop back to step 520 and repeat the process for the feature point k+1. If there are no more feature points to process for frame N (e.g., all feature points of frame N have been processed), the method continues to step 545 where it is determined if frame N is the last frame to be processed. If not, the method continues to step 550 where the recognition and tracking module 225 receives and selects a second frame N+1 (e.g., frame 410) for processing. The method then loops back to step 510 to repeat the process for the next frame N+1. If there are no more frames to process in step 545, the method is complete.

Figure 6:
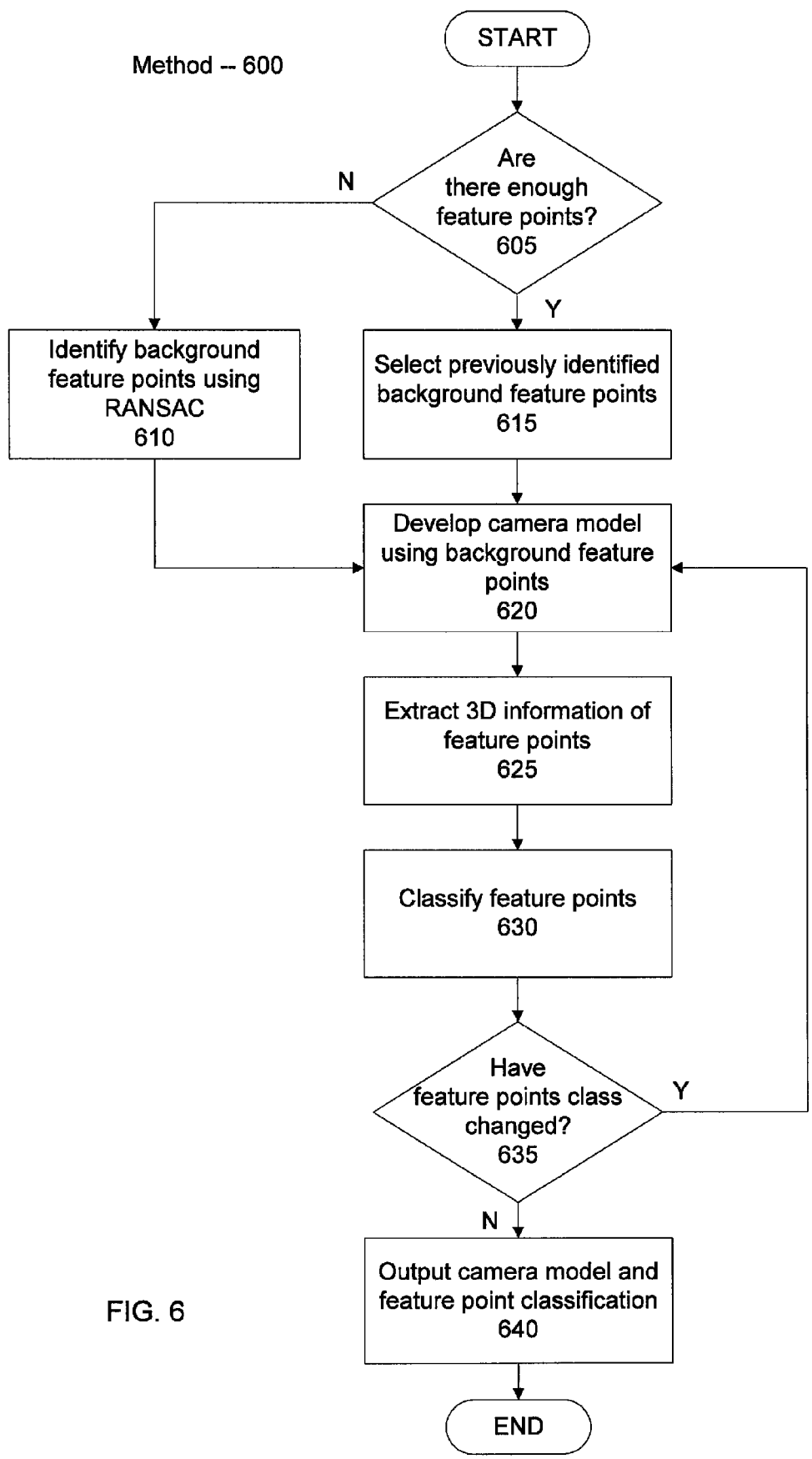
FIG. 6 shows an exemplary method for classifying feature points.

FIG. 6 shows an exemplary method 600 for classifying feature points. First, in step 605, it is determined whether there is a tracking history or if there are enough feature points available from the tracking history of prior video frames of the video image sequence. Generally, enough feature points may be the minimum number of feature points that are needed to generate a camera model. In one exemplary embodiment, a minimum of 5 feature points are needed to generate a camera model. Thus, the threshold of enough feature points in such an embodiment would be 5. However, in other exemplary embodiments, the number of feature points needed to generate a camera model may be more or less than 5. As described above, the thrust of the exemplary embodiments is to use a history of the feature points in order to determine information for the scene. If not enough feature points are available from prior tracking of previous image frames, the RANSAC (RANdom SAmple Consensus) method is used (step 610) to find feature points from background regions, whose movement is due to the camera motion only. For example, using the basketball court example provided above, the end line of the basketball court is only affected by movement of the camera (i.e., the end line itself cannot move). Thus, a feature point associated with the end line is a feature point that is only moving based on the movement of the camera. The RANSAC method is a known manner of resolving such feature points. The RANSAC method uses a simple random sample consensus algorithm for robust fitting of models in the presence of many data outliers.

In contrast, if a sufficient number of feature points exist from previously processed frames, the feature points identified as background classifications are selected in step 615 to continue the classification of the current frame. Thus, the feature points to be used for classifying the feature points of the current frame will either be those determined through RANSAC or those that were obtained from the background classification of the prior frame. For example, RANSAC may be used to provide compensating information when there are some feature points, but not enough existing feature points. In one exemplary embodiment, 5 feature points are used to compute the camera model. If only 3 feature points are identified, RANSAC can be used to randomly select 2 additional feature points to generate the camera model and perform the testing to determine whether the generated model is valid.

The current background feature points identified in step 610 (RANSAC) or in step 615 (carried over from the previous frame) are used to derive the camera model for the current frame in step 620. An exemplary method of deriving a camera model from identified background pixels was described above. However, any known method of deriving a camera model based on the identified background pixels may be used with the exemplary embodiments.

In step 625, the 3D information associated with the feature points may be extracted using the camera model of the current frame and the camera model of the previous frame. The types of 3D information that may be extracted may include a pixel-approximated depth, pixel-approximated 3D coordinates, a pixel association to an object or background, and a pixel 3D trail (history of the pixel with regard to prior image frames). This 3D information may be extracted from the 2D image information based on the camera model for the current frame and the previous frame. As described above with reference to FIG. 3, the real 3D coordinates of the scene may be projected into the 2D image space. Using the history of the camera model from the previous frame and the current camera model, this 2D pixel information based on the feature points may be extracted to determine, for example, the above described 3D information. In general, the difficulty of extracting 3D information from a 2D image comes from the ambiguity that is caused by the camera projection. For each pixel point on the image, all the 3D points that are on the linking line between this image point and the camera's optical center are possible candidates. However, when we have two camera views from different camera positions, this ambiguity can be solved. The best candidate is the point that is closest to both of the link lines between the cameras' optical center and the respective image position in their respective image planes. This may be referred to as a triangulation method. When the two link lines intersect with each other, the intersection point is the solution. If the camera's location does not change, even when is the cameras' model estimation may be somewhat inaccurate, two camera views can still provide enough information to solve the ambiguity and indicate the 3D position of the tracked feature point. In addition, this triangulation may be achieved by one moving camera that provides two successive viewpoints, where the point of interest is static (e.g., belongs to the background or to a temporally stationary object). Moreover, 3D information may be extracted with one calibrated camera view when the point of interest is located on a known plane in space. For example, a pixel that belongs to a player's foot is probably located on the ground plane, etc.

Figure 7:
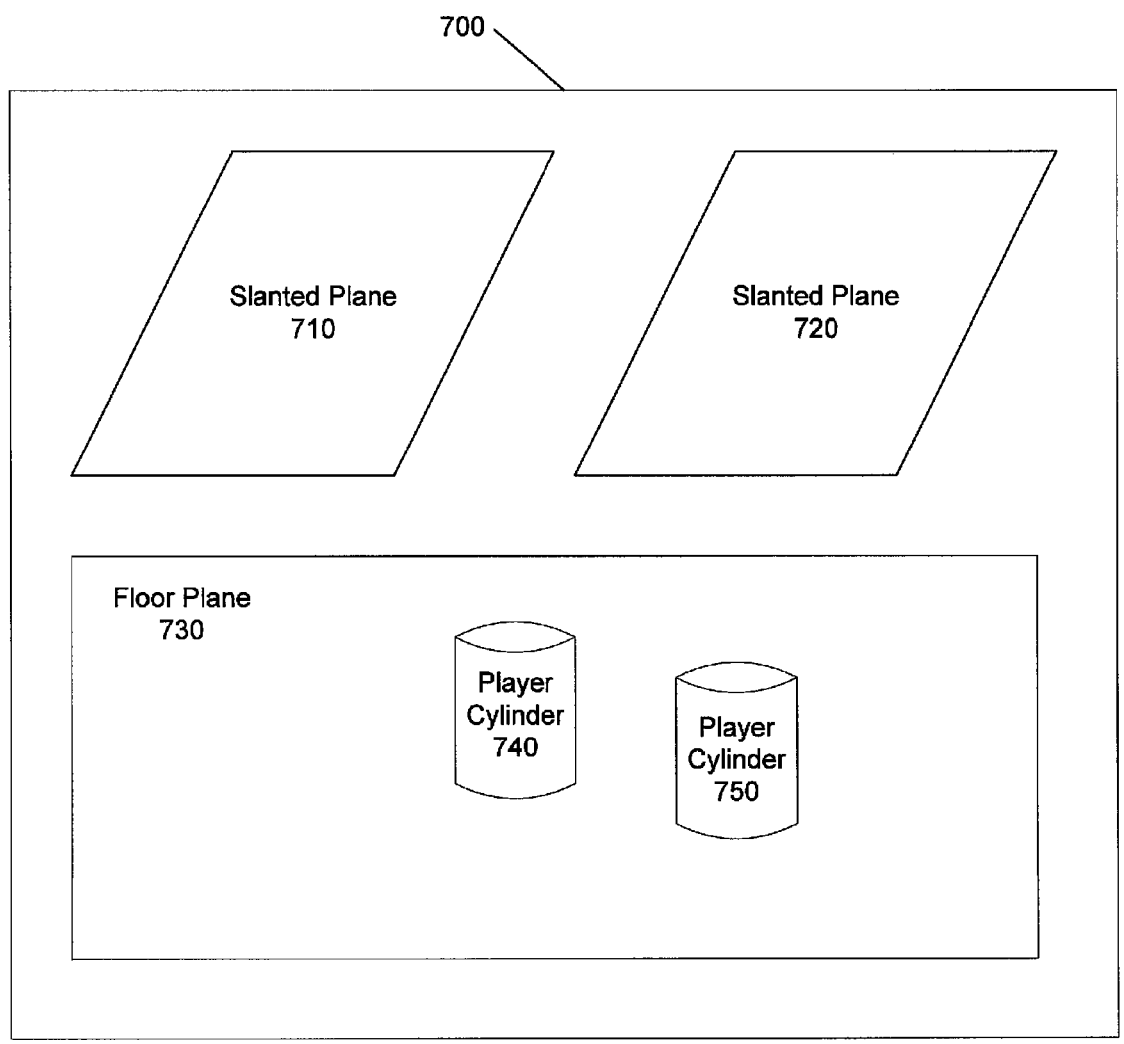
FIG. 7 shows an example of using the extracted 3D information for classifying each feature point based on mapping the feature point to a 3D model within the frame being analyzed.

In step 630, using the extracted 3D information, the feature points are classified. FIG. 7 shows an example of using the extracted 3D information for classifying each feature point based on mapping the feature point to a 3D model within the frame being analyzed. In this example, the model 700 may be any of the frames 400-450 shown in FIG. 4 that include the scene of the basketball arena of FIG. 3. Thus, after the 3D information is extracted for each feature point in a frame, this 3D information may be used to map the feature point to a 3D model based on a foreground and/or background object. In this example, feature-points that may be approximately mapped into a 3D cylindrical model may be classified as belonging to a certain player (e.g., feature points that are mapped to player cylinder 740 may be identified as player 1, while feature points mapped to player cylinder 750 may be identified as player 2). This mapping is based on the history that is stored by the exemplary system (e.g., database 222). For example, in a previous frame multiple feature points may be identified as belonging to player 1. As described above, these feature points may include a feature value indicating a specific property of player 1 and also these feature points will have specific 3D properties that were extracted for the previous frame. The history of the feature points may store the feature value, the 3D information and additional information such as the classification of the point (e.g., foreground, background, unknown), the 3D model the feature point fits into, the reliability of the classification, and how to track the feature point in the consecutive frames. For example, the speed of a ball and the speed of a player are different and should be considered in the procedure of tracking. This history of the feature points for player 1 will be stored for future use during the processing of the current frame. Thus, when the corresponding feature point from the current frame is processed, this history may be used to determine if the feature point remains part of (or can be approximated to) the same model (in this example a cylindrical model 740) associated with player 1. If this is the case, the feature point will be classified as being associated with player 1. This determination may be made by comparing the properties of the currently analyzed feature point with the stored characteristics for the feature point from the previous frames.

Continuing with the example of FIG. 7, feature points that are mapped to a floor plane 730 may be identified as background floor plane pixels, while feature points that are mapped to slanted planes 710 and 720 may be identified as background audience pixels. This classification of pixels would be the same as described above for the cylinder model, but the mapping is to different types of models (flat plane, slanted plane). Those skilled in the art will understand that the particular models that are used for mapping purposes may depend on the scene that is being analyzed. For example, advertising boards may be modeled as flat vertical planes, a ball may be modeled as a spherical model, etc.

With such a camera model, a dynamic reference (background) image may be generated and used for background subtraction when tracking objects from a moving camera. As described above, the background subtraction method currently is only applicable to a static camera system. However, using the pixel classification system of the exemplary embodiments allows the generation of dynamic reference images on a frame-by-frame basis, thereby allowing such a dynamic background reference image to be subtracted from the current frame leaving only the foreground pixels for the purposes of tracking.

Figure 8:
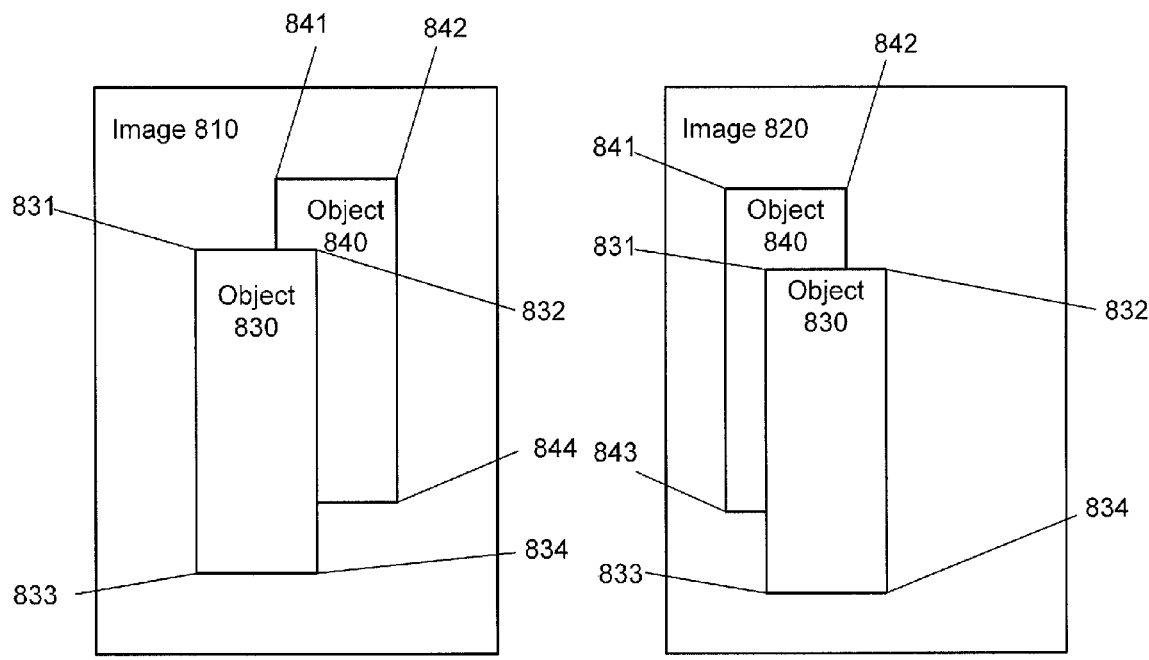
FIG. 8 provides an example of separating occluding objects based on the generated model.

As seen in the case of the of FIG. 7, the classification achieved by the method of the preferred embodiment is not limited to simply classifying pixels as belonging to the foreground or background, but instead permits certain sub-classifications, like the audience and field of play background regions in FIG. 7. Moreover, the fitting of the image pixels into a physical model such as the flat plane or cylinder allows nearby occluding objects to be separable. FIG. 8 provides an example of separating occluding objects 830 and 840 based on the model. In this example, there are two rectangular objects 830 and 840 to track. The four corners 831-834 and 841-844 of each rectangular object 830 and 840, respectively may be tracked in the 2D image space. Image 810 and image 820 may be considered to be segments of any two views that have been captured. In image 810 and image 820, the relative position of the eight corners 831-834 and 841-844 changed due to either camera movement or movement of the objects 830 and 840. Two alternative hypotheses are: (1) all eight points 831-834 and 841-844 belong to the same object, thus should be fitted into a single physical model (e.g., a plane); or (2) the eight points 831-834 and 841-844 belong to two objects and thus should be fitted into two physical models (e.g., planes). To test each hypothesis, the eight points 831-834 and 841-844 are fit into the model and it is determined whether the fitting error is smaller than an acceptable threshold. In this example, no matter how you put the eight feature points 831-834 and 841-844 into a single plane in image 810, the model fitting is not perfect in image 820. However, when you use two planes to fit the two objects 830 and 840 in image 810, a perfect match can be found in image 820. This indicates that hypothesis one is wrong and hypothesis two may be correct. There may be additional hypotheses requiring additional hypotheses tests to make an optimal judgment. In one exemplary embodiment, the number of hypotheses is limited. For example, when an acceptable hypothesis is found to match with n physical models, any hypotheses with more physical models is ignored.

Returning to the method of FIG. 6, the classification of the feature point was described. However, after the initial classification, it is determined in step 635 whether the feature points have changed in class. As described above, a feature point is a pixel location in image space from where a feature is extracted. Moreover, the feature point may have a scalar or a vector value, and it may be computed based on the value of pixels within a neighborhood (region) of this feature point. Thus, in one example, based on the pixel color and the colors of neighboring pixels, the junction of two objects may be determined to indicate a unique point. From this example, it can be seen that another manner of describing a feature point is a distinguishable point in 2D space. However, this may be refined further as a distinguishable point based on a particular model to which the feature point belongs. Various exemplary models have been described above. In addition, as also described above, the type of data that is stored for a feature point may include a descriptor of the model to which the feature point belongs. Thus, based on this description, it can be seen that a feature point may change classification.

In the case that there have been changes in feature point classification within the current frame, this means that there are different background and foreground feature points from the previous frame. Thus, the camera model that was developed using the background feature points from the previous frame would not be entirely accurate and the method loops back to step 620 to determine the current camera model based on the newly identified background feature points for the current frame and the steps of extraction (step 625) and classification (step 630) are repeated based on the updated camera model. It should be noted that it is possible to set a threshold value in step 635 based on the number of feature points that have been reclassified. For example, it may be that the operator of the system desires that a new camera model be calculated if any feature point has changed classification. However, in other instances, the operator may determine that the camera model should be recalculated only when a certain number of feature points (e.g., 5) have been reclassified. Thus, it can be seen that the classification and camera model determination may be an iterative process on a frame-by-frame basis. Once the feature points have been determined to not change based on the previous iteration, the camera model and classification of the feature point may be output for further use in step 640, e.g., by a VIS system.

The database 222 may store the characteristics of tracked foreground and background regions. This information may be used to resolve the tracking at frames where there is not enough differentiating information. For example, with the establishment of a tracking history of all feature points, some pixels that are not separable in one image frame, since their associated features are not discriminative (e.g., two players from the same team are in close proximity to each other), may be separable when using information from pre/post video frames.

Thus, as described herein, the exemplary embodiments achieve the foreground and background tracking through a combined calculation of the camera model and the tracks of the foreground objects. Moreover, by using only pattern recognition to track positional data of foreground objects, the exemplary embodiments avoid using a system in which the positional data of foreground dynamic objects is received from an external source. In addition, the exemplary embodiments provide for 3D information of trackable pixels and regions that is obtained from an image frame of a 2D video image sequence.

It should be noted that the exemplary embodiments are not limited to video sequences that are captured by a single camera. That is, feature point tracking of feature points from multiple cameras may be used in accordance with the examples provided above. In addition, in the exemplary embodiments, it was described that the recognition and tracking module 225 is implemented in a video insertion system. This is only exemplary and the recognition and tracking module including the functionality described herein may be implemented as a stand-alone system or within any other type of video production system. In one example, a sophisticated camera may implement the functionality described herein. Also, while the exemplary embodiments also focused on capturing and processing images related to sporting events, this should also not be considered to be limiting. As should be apparent to those skilled in the art, the exemplary embodiments may be applied to any type of event where the described recognition and tracking functionality will aid the producer to accomplish the production goals.

It is also noted that the exemplary embodiments have been described with reference to using a two-dimensional (2D) to three-dimensional (3D) estimation approach to improve the accuracy of both foreground and background tracking. However, the exemplary embodiments are not required to perform such 2D to 3D estimation because under certain conditions the 2D to 3D estimation will not be accurate (e.g., the moving pattern of the camera and the objects in the field does not provide enough information for a 2D to 3D conversion). The exemplary embodiments may still generate tracking results for both foreground and background pixels based on the 2D information using any existing image-based 2D foreground tracking and camera tracking approaches. In fact, a combination of using existing 2D tracking approaches may accelerate the initial process where the exemplary embodiments attempt to classify enough background feature points to start the 2D to 3D estimation.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, etc. The hardware platform may also be a standard video processing platform and its associated hardware and software components. In a further example, the exemplary embodiments of the recognition and tracking module may be a program containing lines of code stored on a non-transitory computer readable storage medium that, when compiled, may be executed on a processor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent

What is claimed is:

1. A method, comprising:
   determining a camera model based on a first group of feature points extracted from a video frame;
   extracting three-dimensional (3D) information for the first group of feature points and a second group of feature points based on the camera model and a previous camera model for a previous video frame;
   reassigning feature points to the first group or the second group, based on mapping each feature point to a corresponding 3D model using the extracted 3D information for each feature point; and
   determining a new camera model for the first group of feature points when a number of feature points reassigned is greater than a predetermined threshold.

2. The method of claim 1, further comprising:
   extracting new 3D information for the first group of feature points based on the new camera model and the previous camera model for the previous video frame;
   reassigning feature points to the first group or the second group, based on mapping each feature point to a corresponding 3D model using the extracted new 3D information for each feature point; and
   outputting the new camera model and whether the feature points are assigned to the first group or the second group when the number of reassigned feature points is less than the predetermined threshold.

3. The method according to claim 1, wherein each feature point is one of a scalar value and a vector value that is based on a pixel corresponding to the feature point and pixels in a region including the feature point.

4. The method of claim 1, wherein the first group of feature points are one of feature points corresponding to feature points of a previous video frame that have been identified as background feature points and feature points randomly assigned as background feature points by a RANSAC method.

5. The method of claim 1, further comprising:
   determining a motion vector for at least one of the feature points based on a characteristic of the at least one feature point and the characteristic of a corresponding feature point from an adjacent video frame.

6. The method according to claim 1, wherein the 3D information includes one of a pixel-approximated depth, a pixel-approximated 3D coordinate, a pixel association to an object or background, and a pixel 3D trail.

7. The method according to claim 1, wherein the 3D model includes one of a cylindrical model, a horizontal plane model, a vertical plane model, a slanted plane model and a spherical model.

8. The method according to claim 1, further comprising:
   mapping multiple feature points to at least two groups of 3D models, wherein the at least two groups of 3D models represent at least two dynamic objects that partially occlude each other;
   calculating an error for each group of 3D models; and
   selecting one of the groups of 3D models based on the error, wherein 3D information from one of the feature points is used to separate the two dynamic objects that partially occlude each other.

9. A method, comprising:
  extracting a first group of feature points from a video frame;
  determining a camera model based on the first group of feature points;
  extracting a second group of feature points from a video frame;
  extracting three-dimensional (3D) information for the first group of feature points and the second group of feature points based on the camera model and a previous camera model for a previous video frame;
  reassigning feature points to the first group or the second group, based on mapping each feature point to a corresponding 3D model using the extracted 3D information for each feature point; and
  determining a new camera model for the first group of feature points when a number of feature points reassigned is greater than a predetermined threshold.

10. The method of claim 9, wherein the extracting the first group of feature points includes,
  comparing each of a plurality of feature points from the video frame to a corresponding feature point from the previous video frame, and
  identifying each feature point from the video frame as belonging to the first group of feature points when the corresponding feature point from the previous video frame is identified as a background feature point.

11. The method of claim 9, wherein the second group of feature points include foreground feature points and unknown feature points.

12. A video production system, comprising:
  a receiving component configured to receive a video frame;
  an extraction component configured to extract a first group of feature points and a second group of feature points from the video frame;
  a camera model estimator configured to determine a camera model based on the first group of feature points;
  a three-dimensional (3D) extraction component configured to extract 3D information for the first group of feature points and the second group of feature points based on the camera model and a previous camera model for a previous video frame; and
  an assignment component configured to reassign feature points to the first group or the second group, based on mapping each feature point to a corresponding 3D model using the extracted 3D information for each feature point, wherein the camera model estimator determines a new camera model for the first group of feature points when a number of feature points reassigned is greater than a predetermined threshold.

13. The video production system of claim 12, wherein the 3D extraction component is further configured to extract new 3D information for the first group of feature points based on the new camera model and the previous camera model for the previous video frame, the assignment component is further configured to reassign feature points to the first group or the second group, based on mapping each feature point to a corresponding 3D model using the extracted new 3D information for each feature point and, further comprises:
  an output component configured to output the new camera model and whether the feature points are assigned to the first group or the second group when the number of reassigned feature points is less than the predetermined threshold.

14. The video production system of claim 12, further comprising:
  a memory storing the camera model, the feature points and the corresponding first and second group assignments, a reliability of the classifications, the 3D information, a plurality of 3D models and a correlation between each feature point and the corresponding 3D model.

15. The video production system of claim 12, wherein the video production system is included as a component of one of a video insertion system and a camera, and wherein indicia are inserted relative to one of a dynamic object and a background region.

16. The video production system of claim 13, wherein the receiving component receives a further video frame, the extraction component extracts a further first group of feature points from the further video frame, the camera model estimator determines a further camera model based on the further first group of feature points, the 3D extraction component extracts further 3D information for the further first group of feature points based on the further camera model and the new camera model for the video frame and the assignment component reassigns the further feature points to the further first group or a further second group, based on mapping each further feature point to the corresponding 3D model using the extracted further 3D information for each further feature point, wherein the camera model estimator determines a new further camera model when a number of reassigned further feature points is greater than the predetermined threshold.

17. The video production system of claim 12, wherein the first group of feature points are one of feature points corresponding to feature points of a previous video frame that have been identified as background feature points and feature points randomly assigned as background feature points by a RANSAC method.

18. The video production system of claim 12, wherein the classification component is further configured to determine a motion vector for at least one of the feature points based on a characteristic of the at least one feature point and the characteristic of a corresponding feature point from an adjacent video frame.

19. The video production system of claim 12, wherein the 3D information includes one of a pixel-approximated depth, a pixel-approximated 3D coordinate, a pixel association to an object or background, and a pixel 3D trail.

20. The video production system of claim 12, wherein the 3D model includes one of a cylindrical model, a horizontal plane model, a vertical plane model, a slanted plane model and a spherical model.

* * * * *